Aug. 10, 1926.
C. W. PADDICK ET AL
AUTOMATIC TRACTOR HITCH
Filed Sept. 10, 1925
1,595,867
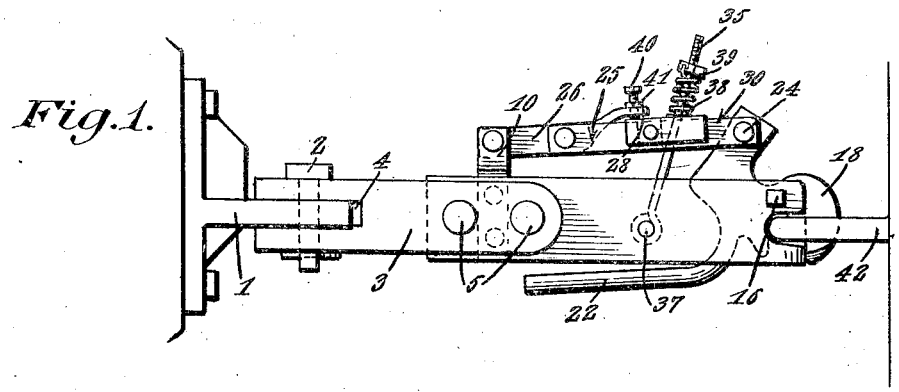
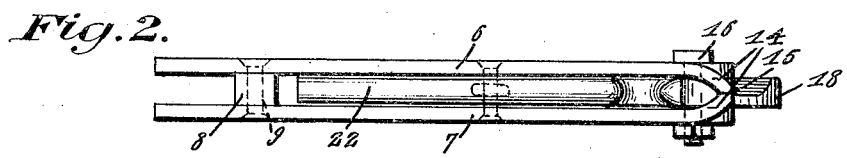
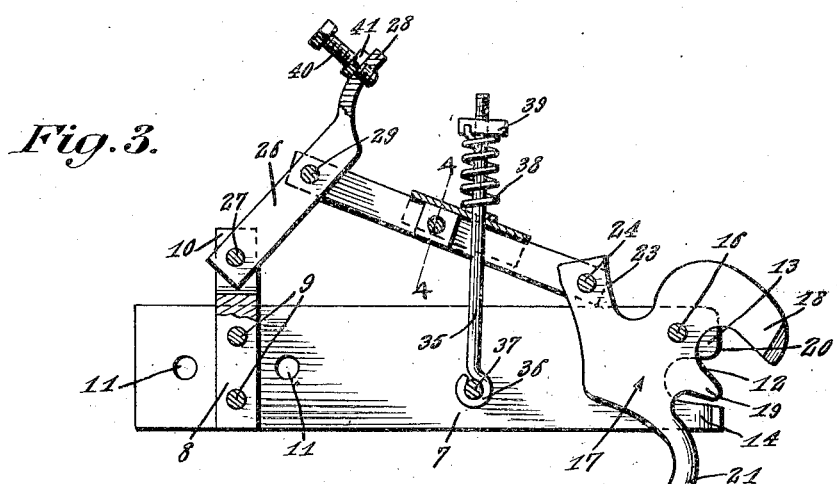
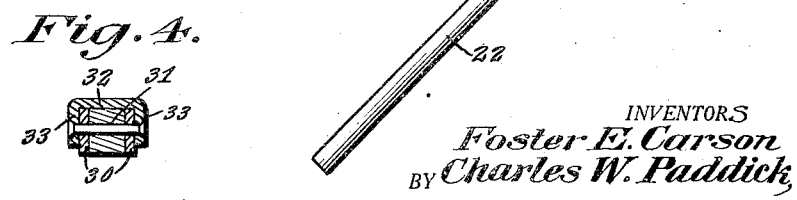
INVENTORS
Foster E. Carson
BY Charles W. Paddick
Geo. P. Kimmel ATTORNEY.

Patented Aug. 10, 1926.

1,595,867

UNITED STATES PATENT OFFICE.

CHARLIE W. PADDICK AND FOSTER E. CARSON, OF WESSINGTON SPRINGS, SOUTH DAKOTA.

AUTOMATIC TRACTOR HITCH.

Application filed September 10, 1925. Serial No. 55,586.

This invention relates to hitching devices and pertains particularly to an automatic hitching and releasing device for the connecting together of a pair of vehicles.

The primary object of this invention is the provision, in a manner as hereinafter set forth, of a hitching device which for all ordinary pulling strain will maintain a proper connection between a pair of vehicles, and under excessive strain will automatically open and release the connection between the vehicles.

Another object of the invention is the provision, in a manner as hereinafter set forth, of a vehicle hitch having an automatic releasing feature which may be adjusted in such a manner as to increase or decrease the amount of pull necessary to release the device.

A still further object of the invention is the provision, in a manner as hereinafter set forth, of a hitching device which may be set to close automatically under the proper conditions, to hitch together a pair of vehicles.

A final object of the invention is the provision, in a manner as hereinafter set forth, of a hitching device of simple construction, strong and durable, easily and quickly operated to engage or release a vehicle, and inexpensive to manufacture.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claim.

In the drawing:—

Figure 1 shows the device embodying this invention in side elevation and having each end thereof connected to the hitching links of vehicles.

Figure 2 is a bottom plan view of the device.

Figure 3 is a central longitudinal sectional view and,

Figure 4 is a section taken upon the line 4—4 of Figure 3.

Referring now to the drawing in detail wherein like numerals of reference indicate corresponding parts throughout the several views, there is indicated by the numeral 1 a hitching plate which may be secured to a tractor or other vehicle, and connected to this hitching plate by means of the pin 2, is a link bar 3 having the bifurcation 4 which overlies the plate, the furcations thereof being one on each side of the plate. The other end of the link 3 is also bifurcated, the slot thereof extending at right angles to the slot 4, and the furcations upon this other end are provided with apertures for the passage therethrough of securing pins 5.

The device embodying this invention comprises a pair of parallel spaced plate members 6 and 7 respectively, of substantial length, width and thickness, and these plates are separated adjacent their rear ends by the bar 8 which is secured to the plate by means of rivets 9, and the upper end of this bar, which projects above the top edge of the plate, is bifurcated to set up the furcations 10. The plates 6 and 7 are provided with a pair of apertures 11 one on either side of the spacing bar 8, the apertures in one plate being in alignment with those in the other plate.

In the forward end edge of each of the plates 6 and 7, there is cut a recess 12, thus forming in each of the plates the upper and lower extensions 13 and 14. The lower extensions 14 are turned inwardly and the ends brought together as indicated at 15, and these inturned ends serve as a stop for a portion of the device about to be described.

Extending through and connecting the upper extensions 13 of the plate, is a pivot pin 16 upon which is pivotally mounted a hitching draw head member indicated generally by the numeral 17. Formed upon and extending along the forward portion of the head 17, is a bill 18 and extending from the under edge of the head in substantially parallel relation with the bill 18 is a tongue member 19 setting up between the bill and tongue the recess 20. Connected to the lower back edge of the head is the curved portion 21 of a lever arm 22 which, when the device is in normal closed position, lies beneath the lower edges of the plates 6 and 7 as shown in Figure 1. When the device is in operative position, to connect a pair of vehicles together, the head so swings that the bill 18 lies along and parallel with the forward edges of the plates 6 and 7 and the free end of the bill abuts the stop formed by the inturned abutting ends 14.

The head 17 has formed at the rear portion of the top edge thereof the upwardly and normally forwardly inclined arm 23 apertured to receive a pivot pin 24.

Extending from the arm 23 back to and positioned between the furcations of the member 8, is a trip bar member indicated generally by the numeral 25. This bar comprises a short section 26, one end of which is secured by the pivot pin 27 between the furcations 10, and the other end of which is curved upwardly and extended forwardly to provide the finger 28. The other portion of the trip bar is indicated by the numeral 30, this portion being formed of two spaced parallel members as shown, the two members being positioned one on each side of the portion 26 intermediate the ends thereof and secured thereto by the pivot pin 29 while the other ends of the members are positioned one on either side of the arm 23 and pivotally secured thereto by the pin 24. At the central portion of the member 30 there is positioned a spacing block 31 and overlying these two members at the central portion thereof is a saddle 32 through the downturned sides 33 of which, together with the two members and the spacing block 31, a securing pin 34 extends.

The saddle member 32 has an aperture through the top thereof through which aperture there is projected the upwardly extending bar 35, the lower end of which is looped as at 36 and pivotally held between the members 6 and 7 by the pin 37. Surrounding the upper end of the bar 35 above the saddle 32 and resting thereon is a helical spring 38 against the upper end of which a securing nut 39 bears which nut is threaded upon the upper end of the bar 35.

The tongue 28 has threadably extended therethrough a set screw 40 with a lock nut 41 thereon and this set screw as shown in Figure 1 bears against the top of the saddle 32 when the trip bar is closed and the device in operation. By the manipulation of this set screw 40, the two members 26 and 30 of the trip bar may be arranged either in parallel relation or partly broken, thus regulating the amount of pressure required to trip the bar when the strain is placed upon the securing bill of the head member 17.

In the operation of this device, one end may be secured by means of the link 3 to a tractor hitch while the other end is set in the open position shown in Figure 3. As shown the trip bar is broken and an attaching link such as that indicated by the numeral 42 may be moved into the recess 20 until it presses against the tongue 12 whereupon further movement will exert sufficient pressure upon the tongue to swing the head thus bringing the bill down across the ends of the device and causing the spring 38 to force the trip bar 25 downwardly locking the hitching attachment in position. When the vehicles are moving one pulling the other, the strain is of course placed upon the bill 18 and in the event that this strain becomes excessive, the bill will be pulled outwardly causing the breaking of the trip bar 25 allowing the same to open as shown in Figure 3 and thus disconnecting the vehicles. As above stated the screw 40 may be so set that the two portions of the trip bar are substantially parallel whereupon a great pressure will be required to break the trip bar whereas if the screw is so set that the trip bar is held in partly broken condition, a lighter strain will cause the complete breakage of the trip bar and the disconnecting of the vehicles.

From the foregoing description it will be readily seen that there has been provided an unique and novel hitching device which will be both strong, durable and serviceable and efficient for the purpose for which it is designed.

Having thus described our invention what we claim is:—

In a hitching device of the character set forth, a pair of spaced parallel plate members each having a recess formed in one end thereof and further having contacting inturned portions beneath said recess, a head pivotally mounted above said recess between said plates and having a bill at the forward part thereof designed to overlie the ends of the plates across said recess and abut said inturned portions, a tongue extending in substantially parallel relation to said bill and designed to swing between the plates, a lever arm extending from the back of the head and designed to swing to a position beneath and parallel with the plates, and a normally upwardly and forwardly inclined arm at the top of the head, and a snap action head actuating means connecting said inclined arm with said plates.

In testimony whereof, we affix our signatures hereto.

CHARLIE W. PADDICK.
FOSTER E. CARSON.